United States Patent
Leu et al.

(10) Patent No.: US 8,740,007 B2
(45) Date of Patent: Jun. 3, 2014

(54) COOKING UTENSIL AND MANUFACTURING METHOD THEREOF

(75) Inventors: Ming-Sheng Leu, Hsinchu County (TW); Wu-Han Liu, Miaoli County (TW); Wei-Tien Hsiao, Hsinchu County (TW); Chang-Chih Hsu, Hsinchu (TW); Mao-Shin Liu, Hsinchu (TW); Zhong-Ren Wu, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 68 days.

(21) Appl. No.: 12/973,913

(22) Filed: Dec. 21, 2010

(65) Prior Publication Data

US 2012/0111872 A1    May 10, 2012

(30) Foreign Application Priority Data

Nov. 8, 2010    (TW) ................................ 99138365 A

(51) Int. Cl.
*A47J 27/00*    (2006.01)
(52) U.S. Cl.
USPC .................. 220/573.1; 220/62.17; 220/573.2; 220/573.3; 220/912; 427/419.2; 427/419.3; 427/446; 427/453; 427/454; 428/34.4; 428/689; 428/697; 428/699
(58) Field of Classification Search
CPC ......... A47J 36/02; A47J 36/025; A47J 36/06; A47J 36/34; A47J 37/10
USPC .................. 220/573.1–573.3, 912; 427/446, 427/453–454, 449, 419.2–419.4; 428/34.4, 428/457, 467, 471–472, 689, 697, 699, 428/701–702
See application file for complete search history.

(56) References Cited

U.S. PATENT DOCUMENTS 3,837,895 A * 9/1974 Pryor et al. ................. 220/573.1
3,966,426 A * 6/1976 McCoy et al. ................. 428/653

(Continued)

FOREIGN PATENT DOCUMENTS

| CN | 1833587 | 9/2006 |
| CN | 201299462 Y | 9/2009 |

(Continued)

OTHER PUBLICATIONS

"Office Action of Taiwan Counterpart Application", issued on Mar. 21, 2013, p. 1-p. 6.

(Continued)

*Primary Examiner* — Mickey Yu
*Assistant Examiner* — Brijesh V. Patel
(74) *Attorney, Agent, or Firm* — Jianq Chyun IP Office

(57) ABSTRACT

A cooking utensil and a manufacturing method thereof are provided. The cooking utensil includes a cooking body, a first metal-ceramic composite layer having an electromagnetic property and a second metal-ceramic composite layer having a heat conductive property. The cooking body has an external bottom surface. The first metal-ceramic composite layer is disposed on the external bottom surface of the cooking body. The second metal-ceramic composite layer is disposed on the first metal-ceramic composite layer. The cooking utensil is suitable for both an induction cooker and a gas burner.

6 Claims, 4 Drawing Sheets

(56) References Cited

U.S. PATENT DOCUMENTS

| | | | |
|---|---|---|---|
| 4,204,021 A * | 5/1980 | Becker | 428/325 |
| 4,646,935 A * | 3/1987 | Ulam | 220/573.1 |
| 4,790,292 A | 12/1988 | Kuhn | |
| 4,911,987 A * | 3/1990 | Sakata et al. | 428/469 |
| 4,977,302 A * | 12/1990 | Merigaud et al. | 99/DIG. 14 |
| 5,064,055 A | 11/1991 | Bessenbach et al. | |
| 5,320,879 A * | 6/1994 | Bullock | 427/576 |
| 5,486,382 A * | 1/1996 | Ference et al. | 427/376.3 |
| 6,073,545 A | 6/2000 | Huppi et al. | |
| 6,123,797 A * | 9/2000 | Pyzik et al. | 427/217 |
| 6,123,998 A * | 9/2000 | Takahashi et al. | 427/446 |
| 6,167,057 A * | 12/2000 | Kishigami et al. | 370/445 |
| 6,740,624 B1 * | 5/2004 | Hoste et al. | 427/62 |
| 7,168,148 B2 * | 1/2007 | Groll | 29/460 |
| 7,378,623 B2 * | 5/2008 | Tarenga | 219/621 |
| 7,488,515 B2 * | 2/2009 | Groll | 427/294 |
| 8,133,596 B2 * | 3/2012 | Groll | 428/653 |
| 2008/0220234 A1 * | 9/2008 | Ko et al. | 427/201 |
| 2009/0120539 A1 * | 5/2009 | Ko et al. | 148/513 |
| 2009/0162670 A1 * | 6/2009 | Lau et al. | 428/433 |
| 2010/0101429 A1 * | 4/2010 | Shigeru et al. | 427/397.7 |
| 2010/0140276 A1 * | 6/2010 | Cuillery et al. | 220/573.2 |
| 2010/0181322 A1 * | 7/2010 | Perillon et al. | 220/573.2 |
| 2011/0198358 A1 * | 8/2011 | Parent et al. | 220/573.1 |

FOREIGN PATENT DOCUMENTS

| | | |
|---|---|---|
| CN | 101862108 A | 10/2010 |
| JP | H0963759 | 3/1997 |
| JP | H10125453 | 5/1998 |
| JP | H11185945 | 7/1999 |
| JP | 2006246998 A | 9/2006 |
| TW | M249595 | 11/2004 |
| TW | M261158 | 4/2005 |
| TW | M274905 | 9/2005 |
| TW | M383986 | 7/2010 |

OTHER PUBLICATIONS

"First Office Action of China Counterpart Application", issued on Jul. 12, 2013, p. 1-p. 10.

* cited by examiner

COOKING UTENSIL AND MANUFACTURING METHOD THEREOF

CROSS-REFERENCE TO RELATED APPLICATION

This application claims the priority benefit of Taiwan application serial no. 99138365, filed on Nov. 8, 2010. The entirety of the above-mentioned patent application is hereby incorporated by reference herein and made a part of this specification.

BACKGROUND OF THE DISCLOSURE

1. Field of the Invention

The disclosure relates to a cooking utensil suitable for both a gas burner and an induction cooker and a manufacturing method thereof.

2. Description of Related Art

Aluminum pots such as aluminum rice boilers, aluminum steaming pots, aluminum flying pans and so on are widely adopted cooking utensils due to their advantages of light weight, portability, fast production rate (as compared with the production rate of steel pans), less energy consumption and rapid heat conduction. Aluminum pots per se are only suitable for gas burners. In the conventional technology, an electromagnetic plate is strongly adhered/connected to the bottom of an aluminum pot by forging/soldering, so that the aluminum pot can also be used on induction cookers.

However, according to the statistics of customer complaints for the cooking utensils manufactured by forging/soldering, the cooking utensils are usually damaged due to two usage habits with gas burners of consumers in the past. The usage habits include the following cases. In a first case, the food in the cooking utensil is left unfinished, and the consumer places the cooking utensil and together with the unfinished food into the refrigerator to keep food refrigerated at about 0° C., The cooking utensil and the unfinished food are taken out and reheated on the induction cooker the next day. In a second case, the cooking utensil is used to cook food on the gas burner (the reference temperature for cooking generally ranges from 100° C. to 260° C.), After the food is removed from the cooking utensil, the cooking utensil is directly rinsed and washed with water under room temperature (15° C. to 30° C.).

Although the cooking utensil may not be handled under such extreme conditions everyday, after few months, responses from the market show that the electromagnetic plate detaches or peels off from the aluminum pot, such that the cooking utensil is damaged and can no longer be used on the induction cooker.

SUMMARY OF THE INVENTION

Accordingly, a cooking utensil satisfying market demands and complying with consuming habits aforementioned is introduced herein. Moreover, the cooking utensil is not damaged when handled under extreme temperatures.

A method of manufacturing a cooking utensil is introduced herein, where two or more metal-ceramic composite layers are rapidly formed on an external bottom surface of a cooking body by using a low temperature spray method. The method of manufacturing the cooking utensil is simple, easy, and suitable for mass production.

A cooking utensil including a cooking body, a first metal-ceramic composite layer having an electromagnetic property, and a second metal-ceramic composite layer having a heat conductive property is introduced herein. The cooking body has an external bottom surface. The first metal-ceramic composite layer is disposed on the external bottom surface of the cooking body. The second metal-ceramic composite layer is disposed on the first metal-ceramic composite layer.

A method of manufacturing a cooking utensil is further introduced herein. A cooking body having an external bottom surface is provided. A first metal-ceramic composite layer having an electromagnetic property is formed on the external bottom surface of the cooking body by using a low temperature spray method. A second metal-ceramic composite layer having a heat conductive property is then formed on the first metal-ceramic composite layer by using the low temperature spray method.

In light of the foregoing, the disclosure is directed to a cooking utensil suitable for both a gas burner and an induction cooker and a manufacturing method thereof. The cooking body is fabricated with a non-electromagnetic metal material. The implementation thereof includes the following. The first metal-ceramic composite layer having the electromagnetic property and the second metal-ceramic composite layer having the heat conductive property are sequentially formed on the external bottom surface of the cooking body by using the low temperature spray method. Consequently, the originally non-electromagnetic cooking body can also be used on the induction cooker and capable of reaching the boiling temperature rapidly, such that the cooking utensil is practical for cooking food. As the first metal-ceramic composite layer having the electromagnetic property manufactured in the disclosure has superior adhesion to the external bottom surface of the cooking body, the first metal-ceramic composite layer is capable of tolerating a sudden wide range of temperature change without detaching from the external bottom surface of the cooking body, and thus, damage of the cooking utensil does not occur.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
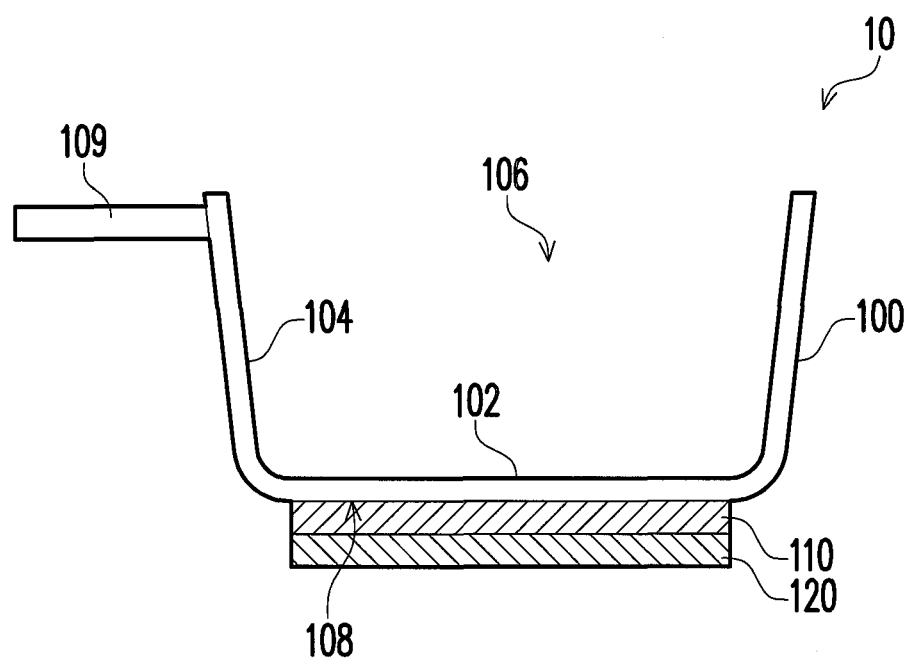
FIG. 1 is a schematic cross-sectional view illustrating a cooking utensil according to an exemplary embodiment.

FIG. 1 is a schematic cross-sectional view illustrating a cooking utensil according to an exemplary embodiment. Referring to FIG. 1, a cooking utensil 10 includes a cooking body 100, a first metal-ceramic composite layer 110 having an electromagnetic property, and a second metal-ceramic composite layer 120 having a heat conductive property. The cooking body 100 has a bottom portion 102 and a sidewall 104 extended upwardly from the bottom portion 102. The bottom portion 102 and the sidewall 104 define a cooking space 106. The cooking body 100 can be a frying pan, a wok, a soup caldron, a pot, or so on. The cooking body 100 also includes a handle 109. In addition, the cooking body 100 has an external bottom surface 108 which is in contact with a heating unit (not shown). The heating unit is, for example, a gas burner or an induction cooker.

It should be noted that in the present disclosure, the cooking body 100 does not have an electromagnetic property. In other words, the cooking body 100 itself can not be used on an induction cooker. The cooking body 100 is fabricated with aluminum, copper, silver, titanium, or an alloy thereof.

The first metal-ceramic composite layer 110 is disposed on the external bottom surface 108 of the cooking body 100. A metal portion of the first metal-ceramic composite layer 110 includes iron, cobalt, nickel, or an alloy thereof. A ceramic portion of the first metal-ceramic composite layer 110 includes iron oxide, cobalt oxide, nickel oxide, or a combination thereof. The metal portion accounts for 50 wt % to 85 wt % of the first metal-ceramic composite layer 110.

A tensile bond value between the first metal-ceramic composite layer 110 and the external bottom surface 108 of the cooking body 100 is larger than 4000 Psi, for instance. As a consequence, the first metal-ceramic composite layer 110 does not detach or peel off from the external bottom surface 108 of the cooking body 110 when repetitively handled under extreme temperatures. In addition, an average residual value of a Gaussian value of the first metal-ceramic composite layer 110 is larger than 3 G and a center residual value of the Gaussian value of the first metal-ceramic composite layer 110 is larger than 6 G, where both of these values are higher than those of a commercial cooking utensil. Therefore, the cooking utensil 10 of the disclosure is capable of boiling water faster than any commercial cooking utensil when used on an induction cooker.

The second metal-ceramic composite layer 120 is disposed on the first metal-ceramic composite layer 110. A metal portion of the second metal-ceramic composite layer 120 includes aluminum or an alloy thereof. A ceramic portion of the second metal-ceramic composite layer 120 includes aluminum oxide. The metal portion accounts for 20 wt % to 85 wt % of the second metal-ceramic composite layer 120. The second metal-ceramic composite layer 120 not only increases a heating rate of the cooking utensil 10, but also protects the first metal-ceramic composite layer 110 from being contaminated or damaged by the external environment (i.e. moisture).

Additionally, a thickness of the first metal-ceramic composite layer 110 ranges from 150 μm to 1.2 mm, for example, and a thickness of the second metal-ceramic composite layer 120 ranges from 50 μm to 200 μm, for example.

Figure 2A:
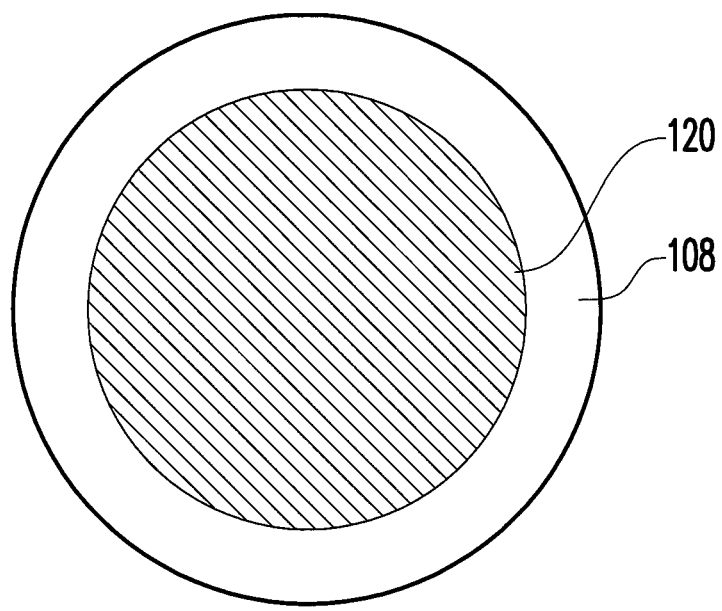
FIG. 2A is a schematic top view of an external bottom surface illustrating a cooking utensil according to an exemplary embodiment.

In one exemplary embodiment, the first metal-ceramic composite layer 110 and the second metal-ceramic composite layer 120 are circular and disposed partially on the external bottom surface 108 of the cooking body 100, as shown in FIG. 2A. It is appreciated by persons skilled in the art that the first metal-ceramic composite layer 110 and the second metal-ceramic composite layer 120 that are circular can also be disposed entirely on the external bottom surface 108 of the cooking body 100 (not shown).

Figure 2B:
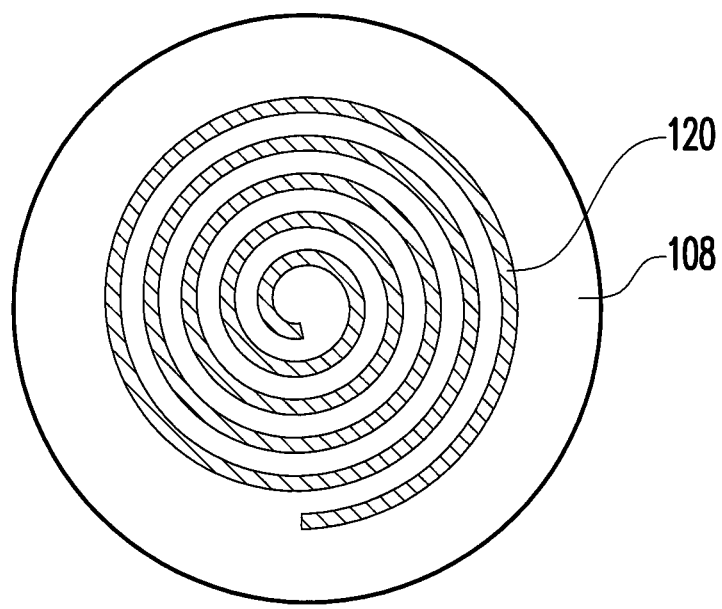
FIG. 2B is a schematic top view of an external bottom surface illustrating a cooking utensil according to another exemplary embodiment.

In another exemplary embodiment, the first metal-ceramic composite layer 110 and the second metal-ceramic composite layer 120 are disposed on the external bottom surface 108 of the cooking body 100 in a spiral manner, as shown in FIG. 2B.

Figure 2C:
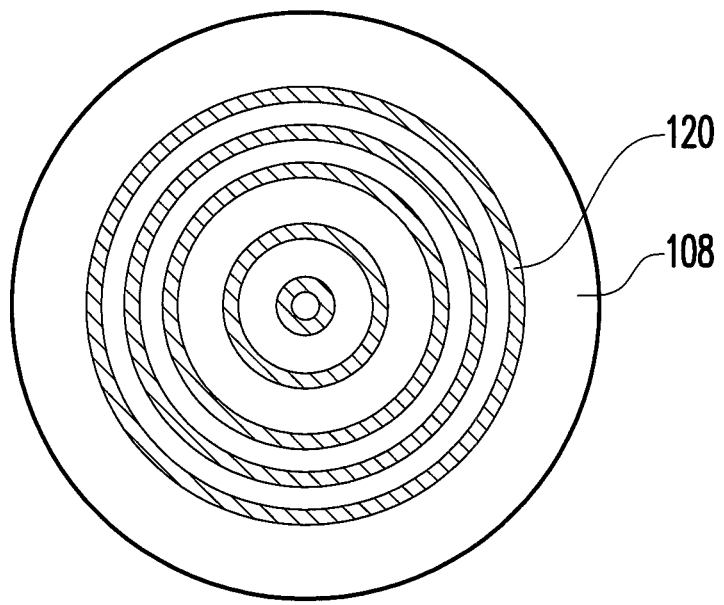
FIG. 2C is a schematic top view of an external bottom surface illustrating a cooking utensil according to another exemplary embodiment.

In another exemplary embodiment, the first metal-ceramic composite layer 110 and the second metal-ceramic composite layer 120 are disposed on the external bottom surface 108 of the cooking body 100 in a concentric circular manner, as shown in FIG. 2C. A distance between adjacent concentric circles can be the same or different.

In the above exemplary embodiment, the first metal-ceramic composite layer 110 having the electromagnetic property and the second metal-ceramic composite layer 120 having the heat conductive property that are sequentially disposed on the external bottom surface 108 of the cooking body 100 are used as an example for illustration. However, the disclosure is not limited thereto. In other words, the number of coatings on the external bottom surface 108 of the cooking body 100 is not limited in the disclosure. It is appreciated by persons skilled in the art that each of the electromagnetic coating and the heat conductive coating of the disclosure can be a single layer or includes multiple layers, and the dispositions thereof can be varied.

In one exemplary embodiment (not shown), the cooking utensil 10 of the disclosure further includes a third metal-ceramic composite layer having an electromagnetic property. The third metal-ceramic composite layer is disposed between the external bottom surface 108 of the cooking body 100 and the first metal-ceramic composite layer 110 to enhance the adhesion therebetween so as to prevent the coating layer from peeling off from the external bottom surface 108 of the cooking body 100. For instance, when the first metal-ceramic composite layer 110 is manufactured with cobalt and cobalt oxide, the third metal-ceramic composite layer is manufactured with iron and iron oxide. Herein, cobalt and cobalt oxide increase corrosion resistance and iron and iron oxide increase adhesion.

A thickness of the third metal-ceramic composite layer ranges from 150 μm to 1.2 mm, for example. The third metal-ceramic composite layer and the first metal-ceramic composite layer 110 are fabricated with the same material or different materials.

In another exemplary embodiment (not shown), the cooking utensil 10 of the disclosure further includes a fourth metal-ceramic composite layer having a heat conductive property. The fourth metal-ceramic composite layer is disposed between the third metal-ceramic composite layer and the first metal-ceramic composite layer 110. A thickness of the fourth metal-ceramic composite layer ranges from 50 μm to 200 μm, for example. The fourth metal-ceramic composite layer and the second metal-ceramic composite layer 120 are fabricated with the same material or different materials.

Figure 3A:
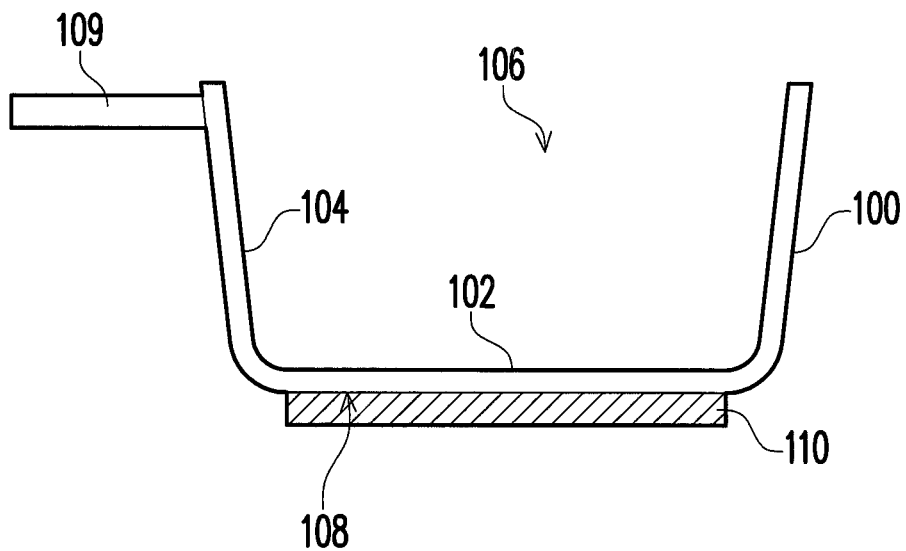
FIGS. 3A to 3B are schematic cross-sectional views illustrating a method of manufacturing a cooking utensil according to an exemplary embodiment.

Next, a method of manufacturing a cooking utensil in the disclosure is illustrated. Referring to FIG. 3A, a cooking body 100 is provided. The cooking body 100 has a bottom portion 102, a sidewall 104, an external bottom surface 108 and a handle 109. The material and the connection of the components of the cooking body 100 are as illustrated in FIG. 1, and the details are thus omitted hereinafter. A first metal-ceramic composite layer 110 having an electromagnetic property is formed on the external bottom surface 108 of the cooking body 100 by using a low temperature spray method.

Figure 3B:
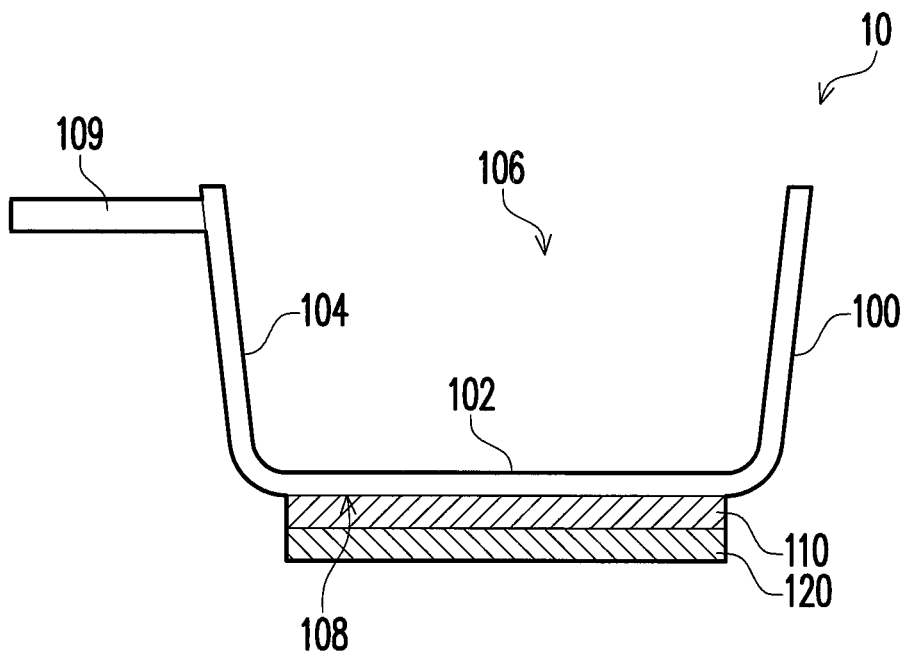

Referring to FIG. 3B, a second metal-ceramic composite layer 120 having a heat conductive property is then formed on the first metal-ceramic composite layer 110 by using the low temperature spray method. Up to this point, the manufacture of the cooking utensil 10 is completed.

An average temperature of the low temperature spray method is less than or equal to 200° C. The low temperature spray method includes a plasma spray method, an arc spray method, a flame spray method, or a high velocity oxy-fuel (HVOF) method. The materials of the first metal-ceramic composite layer 110 and the second metal-ceramic composite layer 120 are as illustrated in FIG. 1 and thus not described hereinafter.

The method of manufacturing the cooking utensil in the disclosure is fast, simple, and suitable for mass production. In the method of manufacturing the cooking utensil of the disclosure, the first metal-ceramic composite layer 110 and the second metal-ceramic composite layer 120 are manufactured on the external bottom surface 108 of the cooking body 100 continuously using the low temperature spray method.

In one exemplary embodiment, after the cooking body 100 is provided and before the first metal-ceramic composite layer 110 is formed, a third metal-ceramic composite layer having an electromagnetic property is further formed on the external bottom surface 108 of the cooking body 100 by using the low temperature spray method. The third metal-ceramic composite layer and the first metal-ceramic composite layer 100 are fabricated with the same material or different materials.

In another exemplary embodiment, after the third metal-ceramic composite layer aforementioned is formed and before the first metal-ceramic composite layer 110 is formed, a fourth metal-ceramic composite layer having a heat conductive property is further formed on the third metal-ceramic composite layer by using the low temperature spray method. The fourth metal-ceramic composite layer and the second metal-ceramic composite layer 120 are fabricated with the same material or different materials.

In the following, a plurality of exemplary examples are illustrated to show the efficacy of the disclosure.

An experimental group is the cooking utensil of the disclosure. Herein, an electromagnetic layer and a heat conductive layer are sequentially plasma-sprayed on an aluminum pot with a spray gun (F4 gun) having a spray nozzle of 6 mm at a spray distance of 130 mm. The parameters of the plasma spray method includes an plasma argon flow of 38 l/min, a hydrogen flow of 10 l/min, an oxygen flow of 8 l/min, an electric current of 500 A, a powder gas argon flow of 3.5 l/min and a powder feed rate of 50 g/min. A diameter of the external bottom surface of the aluminum pot is 175 mm. A composition of the electromagnetic layer is a metal-ceramic composite layer of iron and iron oxide, and the ratio of iron to iron oxide is 79 wt % to 21 wt %. A tensile bond value between the electromagnetic layer and the aluminum pot is 6096 Psi. A composition of the heat conductive layer is a metal-ceramic composite layer of aluminum and aluminum oxide, and the ratio of aluminum to aluminum oxide is 75 wt % to 25 wt %.

A cooking utensil of a control group 1 is an aluminum pot with AISI 420 electromagnetic layer arc sprayed on the external bottom surface thereof.

A cooking utensil of a control group 2 is a commercial 304 stainless steel cooking utensil.

Table 1 shows testing results of the experimental group and the control groups.

TABLE 1

|  | Cooking utensil of the disclosure | Cooking utensil of control group 1 | Cooking utensil of control group 2 |
| --- | --- | --- | --- |
| center residual value of Gaussian value on external bottom surface of cooking utensil | 11 | 4.8 | 5.37 |

TABLE 1-continued

|  | Cooking utensil of the disclosure | Cooking utensil of control group 1 | Cooking utensil of control group 2 |
| --- | --- | --- | --- |
| average residual value of Gaussian value on external bottom surface of cooking utensil | 3.87 | 1.65 | 2.65 |
| Has water inside the cooking utensil reached the boiling temperature? | Yes | No | Yes |

Referring to Table 1, comparing the experimental group and control groups 1 and 2, it is shown that the cooking utensil of the disclosure has higher center residual value and average residual value of the Gaussian value than the commercial cooking utensils. Therefore, the cooking utensil of the disclosure is capable of boiling water faster than any commercial cooking utensil when used on an induction cooker.

Further, when 600 ml of water is poured into the cooking utensil for heating on the induction cooker, the water inside the cooking utensils of the experimental group and the control group 2 can reach the boiling temperature (100° C.). However, the water in the cooking utensil of the control group 1 only reaches 80° C.; that is, the water can not be boiled. In other words, instead of being used to cook food, the cooking utensil of the control group 1 can only be utilized for heating food. Although the cooking utensils of the experimental group and the control group 2 can both be used for cooking food, the aluminum pot in the experimental group has lighter weight, lower cost, and easier manufacture as compared with the stainless steel pot in the control group 2, and is likely to attract more attention of the manufacturers.

Additionally, the cooking utensil of the disclosure is tested by simulating the handling of consumers. In the first case, the cooking utensil of the disclosure is cooled at 0° C. (the freezing point) and then heated on the induction cooker until the water inside the cooking utensil reaches the boiling point. After 10 repetitive trials, the coating layer remains attached to the bottom of the cooking utensil and does not peel off therefrom. In the second case, the cooking utensil of the disclosure is heated to about 260° C. on the gas burner and then quenched to about 60° C. using water under room temperature. After 10 repetitive trials, the coating layer remains attached to the bottom of the cooking utensil and does not peel off therefrom.

In summary, a method that is simple and suitable for mass production is provided in the disclosure. In the method, the first metal-ceramic composite layer having the electromagnetic property and the second metal-ceramic composite layer having the heat conductive property are sequentially sprayed on the external bottom surface of the non-electromagnetic metal cooking body by using the low temperature spray method. Thus, the metal-ceramic composite layer having the electromagnetic property manufactured in the disclosure has superior adhesion to the external bottom surface of the cooking body, and is capable of tolerating a sudden wide range of temperature change without detaching from the external bottom surface of the cooking body, and thus, damage of the cooking utensil does not occur.

Furthermore, the method of the disclosure does not require thermal treatment and is thus faster than the traditional mechanical pressing method, soldering method, or forging method. The method in the disclosure does not involve damages caused by long term contact with acids or basic solutions resided from the plating process, or food contamination or other environmental issue.

It will be apparent to those skilled in the art that various modifications and variations can be made to the structure of the disclosed exemplary embodiments without departing from the scope or spirit of the disclosure. In view of the foregoing, it is intended that the disclosure cover modifications and variations of this disclosure provided they fall within the scope of the following claims and their equivalents.

What is claimed is:

1. A cooking utensil, comprising:
   a cooking body having an external bottom surface, wherein the cooking body does not have an electromagnetic property;
   a first metal-ceramic composite layer having an electromagnetic property disposed on the external bottom surface of the cooking body, wherein a metal portion of the first metal-ceramic composite layer comprises iron, cobalt, nickel, or an alloy thereof, a ceramic portion of the first metal-ceramic composite layer comprises iron oxide, cobalt oxide, nickel oxide, or a combination thereof, and the metal portion accounts for 50 wt % to 85 wt % of the first metal-ceramic composite layer;
   a second metal-ceramic composite layer having a heat conductive property disposed on the first metal-ceramic composite layer, wherein the second metal-ceramic composite layer contacts an external environment, and wherein a metal portion of the second metal-ceramic composite layer comprises aluminum or an alloy thereof, a ceramic portion of the second metal-ceramic composite layer comprises aluminum oxide, and the metal portion accounts for 20 wt % to 85 wt % of the second metal-ceramic composite layer; and
   a third metal-ceramic composite layer having an electromagnetic property disposed between the external bottom surface of the cooking body and the first metal-ceramic composite layer, wherein the third metal-ceramic composite layer and the first metal-ceramic composite layer are fabricated with different materials.

2. The cooking utensil as claimed in claim 1, wherein a material of the cooking body comprises aluminum, copper, silver, titanium, or an alloy thereof.

3. The cooking utensil as claimed in claim 1, wherein a thickness of the first metal-ceramic composite layer ranges from 150 $\mu$m to 1.2 mm and a thickness of the second metal-ceramic composite layer ranges from 50 $\mu$m to 200 $\mu$m.

4. The cooking utensil as claimed in claim 1, wherein the first metal-ceramic composite layer and the second metal-ceramic composite layer are disposed on the external bottom surface entirely or partially in a circular, a spiral, or a concentric circular manner.

5. The cooking utensil as claimed in claim 1, wherein a tensile bond value between the first metal-ceramic composite layer and the external bottom surface of the cooking body is larger than 4000 Psi.

6. The cooking utensil as claimed in claim 1, wherein an average residual value of a Gaussian value of the first metal-ceramic composite layer is larger than 3 G and a center residual value of the Gaussian value of the first metal-ceramic composite layer is larger than 6 G.

* * * * *